Patented May 2, 1950

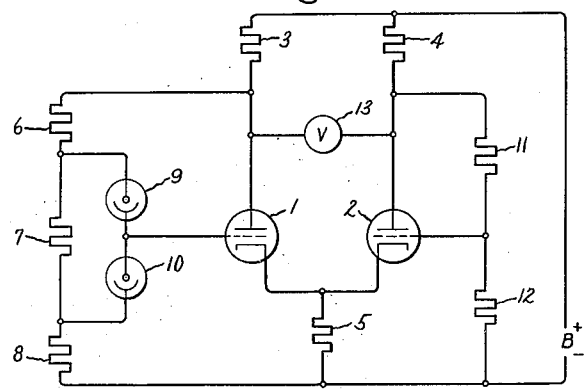
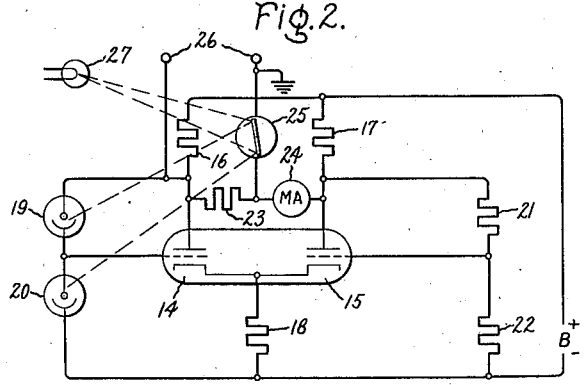
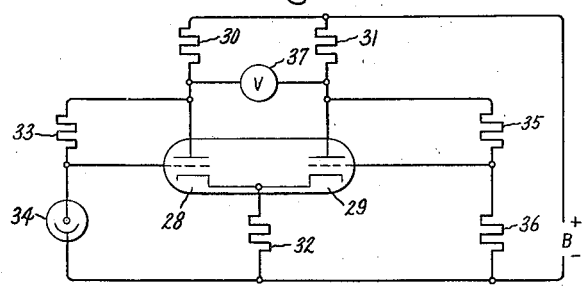

2,506,384

UNITED STATES PATENT OFFICE 2,506,384

MEASURING CIRCUITS

Theodore A. Rich, Schenectady, N. Y., assignor to General Electric Company, a corporation of New York Application February 3, 1949, Serial No. 74,433

6 Claims. (Cl. 250—214)

1

This invention relates to measuring circuits, and in particular to improved circuits for use with phototubes.

An object of the invention is to provide improved circuits for phototubes.

Another object is to provide improved circuits for other measuring elements having an impedance which varies responsive to a measured quantity.

Another object is to provide circuits of the type described which are substantially unaffected by supply voltage variations.

Another object is to provide circuits of the type described which have an improved high frequency response.

Other objects and advantages will appear as the description proceeds.

These circuits are hereinafter described by means of illustrative embodiments using phototubes. However, it will be appreciated that the circuits are also useful with other measuring elements having an impedance which varies responsive to a measured quantity, and that such elements can be substituted for the phototubes in the circuits described. Thermistors and resistance wire strain gauges are two examples of measuring elements which might be so used.

In circuits of this type, the input signal is basically a changing impedance—for example, phototube impedance which changes responsive to changes in incident light—and changes in voltage or current are merely results of the impedance change. In fact, as is hereinafter shown, voltage changes in particular may be undesirable.

The features of the invention which are believed to be novel and patentable are pointed out in the claims forming a part of this specification. For a better understanding of the invention, reference is made in the following description to the accompanying drawing in which Figs. 1, 2, and 3, respectively, are circuit diagrams of three embodiments of the invention.

Referring now to Fig. 1, two vacuum tube sections, 1 and 2, each has a cathode, control grid, and plate, as shown. These sections are not necessarily triodes: if tetrodes or pentodes are used, the screen and suppressor grids may be connected with appropriate circuit elements as in a conventional vacuum tube amplifier. The two vacuum tube sections may be in separate envelopes, as indicated in Fig. 1, or each may be half of a twin tube, as indicated conventionally in Figs. 2 and 3. Since the two cathodes are connected together, it is possible to use twin tubes having a common cathode for the two sections, such as the 6J6 miniature twin triode.

Again referring to Fig. 1, load resistors 3 and 4 are respectively connected to the two plates as shown, and a cathode resistor 5 is connected so that it is common to both sections. Preferably, resistors 3 and 4 are equal in value, so that the circuit is symmetrical. Three resistors 6, 7, and 8 are connected in series between the plate of section 1 and cathode resistor 5. Two phototubes 9 and 10, which may be contained in a single envelope, are connected in series across resistor 7, and the control grid of vacuum tube section 1 is connected to the junction of the two phototubes. The values of resistors 6, 7 and 8 are selected to provide proper operating voltage across the phototubes. Two resistors 11 and 12 are connected in series between the plate of section 2 and cathode resistor 5. The control grid of section 2 is connected to the junction of resistors 11 and 12. Conventional connections, not completely shown, are provided to apply plate and heater operating voltages to the vacuum tube sections. The plate voltage supply is conventionally indicated by the letter B. Voltmeter 13, or other voltage-responsive apparatus, is connected between the plates of the two vacuum tube sections.

The circuit shown in Fig. 1 is especially adapted for use in a measuring or control circuit of the type in which a light beam is deflected responsive to a measured quantity. For example, the light beam may be deflected by movement of the mirror of a mirror galvanometer. The beam may be adjusted so that in its normal or zero position equal amounts of light strike phototubes 9 and 10. When the beam is deflected, different amounts of light strike the phototubes, thus producing a change in their relative resistances. This circuit is also adapted to compare two light beams striking respective ones of the two phototubes.

Resistors 6, 7, and 8 and phototubes 9 and 10 constitute a voltage divider which establishes the potential at the control grid of vacuum tube section 1. Resistors 11 and 12 constitute a second voltage divider which establishes the potential at the control grid of vacuum tube section 2. At balance, which for the usual adjustment of circuit values occurs when equal amounts of light strike phototubes 9 and 10, the two control grids have equal potentials, and vacuum tube sections 1 and 2 conduct equal amounts of current. Then the two plates likewise have equal potentials, and voltmeter 13 indicates "zero" or balance.

As the light beam is deflected so that more light falls on phototube 9 than on phototube 10, the resistance of tube 9 becomes less than that of tube 10. This tends to increase the control grid potential of section 1, and thus causes this section to conduct more current. The increased current produces a larger voltage drop across load resistor 3, which lowers the potential of the plate of section 1. Since the voltage divider 6, 7, 8, 9, 10 is connected between this plate and the cathode resistor, the drop in plate potential tends to decrease the control-grid potential, and thus limits the increase in current. The result is similar to a negative feedback action, and is more fully discussed hereinafter. There is, however, a very small net increase in the control grid potential of section 1, and a larger decrease in plate potential as a result of the increase in current through resistor 3.

When current through section 1 increases, the voltage drop across cathode resistor 5 also increases, which raises the potential of both cathodes. The effect on section 1 is small, because most of the increase in current through section 1 is balanced by a decrease in current through section 2, as will now be explained, and only the net increase affects the cathode potential since both currents flow through resistor 5. In section 2, the increase in cathode potential has the same effect as a reduction in grid potential: that is, the current through section 2 is decreased. This causes a decrease in voltage drop across load resistor 4, and a consequent increase in the plate potential of section 2. Voltage divider 11, 12 provides negative feedback which limits the amount of plate voltage change.

It has been shown that when more light strikes phototube 9 than phototube 10, the plate potential of vacuum tube section 1 decreases while the plate potential of vacuum tube section 2 increases. An opposite change occurs when more light strikes phototube 10 than phototube 9. The resulting voltage between the two plates is measured by voltmeter 13, which provides an indication of the inequality in amount of light striking the two phototubes. In place of voltmeter 13 which indicates this inequality, other voltage-responsive apparatus may be substituted, such as a recorder to provide a permanent record, or a relay to operate other apparatus responsive to a predetermined degree of inequality.

Vacuum tube section 1, with its plate-to-cathode circuit comprising load resistor 3 and cathode resistor 5, is in effect a D.-C. amplifier, since any change in the potential of its control grid causes a larger change in the opposite direction of its plate potential. As has already been mentioned, phototubes 9 and 10 are part of a voltage divider which is connected in a manner similar to a negative feedback circuit with respect to section 1. This arrangement provides several advantages, one of which is that relatively little net change occurs in the potential of the control grid.

For comparison, suppose that the voltage divider comprising the phototubes were connected directly across the supply voltage—an arrangement commonly used in prior art circuits. With this prior art arrangement, the voltage across the phototube voltage divider is constant, and relatively wide swings in control-grid potential of vacuum tube section 1 occur when the relative resistances of the two phototubes change responsive to changes in the relative amount of light striking the two tubes. Each time the control-grid potential changes, the grid-to-cathode capacitance of the vacuum tube and capacitances in the wiring must be charged or discharged through the relatively high resistance of the phototubes. This introduces an objectionably large time constant into the circuit, which greatly attenuates high-frequency changes and prevents an adequate response to rapid fluctuations.

With the improved circuit shown in Fig. 1, there is relatively little change in the control-grid potential, and hence much less time is required to charge or discharge the control grid capacitances. Response of the circuit is thus much more rapid, and high-frequency fluctuations are less seriously attenuated.

The usual advantages associated with negative feedback circuits are also obtained. For example, vacuum tube charateristics have little effect upon the circuit, since the gain of both vaccum tube sections is principally determined by the feedback ratio. Thus, the aging or replacement of vacuum tubes does not ordinarily necessitate recalibration of the circuit.

The symmetry of the circuit gives relative freedom from errors due to supply voltage variations. At balance, vacuum tube sections 1 and 2 conduct equal amounts of current, and any change in supply voltage will have substantially equal effect upon both sections. Therefore, such variations cause no appreciable error in the indication of voltmeter 13 at balance. When, due to unequal illumination of phototubes 9 and 10 the circuit is unbalanced, supply voltage variations may cause somewhat larger errors, but these errors are still small relative to those which might occur in an unsymmetrical circuit.

Numerous variations of the basic circuit are possible. Refer now to Fig. 2, which shows one variation. Two vacuum tube sections 14 and 15 are employed as before, together with load resistors 16 and 17, and a common cathode resistor 18. The voltage divider connected to section 14 comprises two vacuum-type phototubes 19 and 20. When this type phototube is used, no resistors are needed in the phototube voltage divider; in other words, resistors corresponding to 6 and 8, Fig. 1, are reduced to zero resistance and the resistor corresponding to 7, Fig. 1, is increased to infinite resistance. Connected to vacuum tube section 15 is a voltage divider comprising two resistors 21 and 22, which correspond to resistors 11 and 12, Fig. 1. In its principles of operation, the circuit shown in Fig. 2 is the same as that of Fig. 1. However, the following additional modification has been made to illustrate one way of using these circuits:

Instead of a voltmeter, the voltage-responsive apparatus connected between the two plates in Fig. 2 comprises a resistor 23 and a milliammeter 24. Connected to the junction of the resistor and the milliammeter is a mirror galvanometer 25 of the fluxmeter type which has negligible restoring torque. The mirror of such a galvanometer tends to rotate, within limits, so long as any current flows through the galvanometer. When current stops flowing, the mirror tends to remain stationary in its last position. Connections to terminals 26 are provided as shown, and a lamp 27 is positioned to direct a beam of light onto the galvanometer mirror, from which it is reflected to phototubes 19 and 20.

The arrangement shown in Fig. 2 operates as a self-balancing potentiometer. A voltage to be measured is applied to terminals 26. This voltage produces a current through galvanometer 25, which causes the galvanometer mirror to rotate until more light strikes one of the phototubes than the other. As a result the circuit is unbalanced, and the potential of one plate rises while the potential of the other plate falls. This produces a voltage across resistor 23 of opposite polarity to the voltage applied to terminals 26. When these two voltages are equal, no more current flows through galvanometer 25 and rotation of the galvanometer mirror stops. The indication of milliammeter 24 is then proportional to the voltage measured. Sensitivity of the potentiometer can be increased either by decreasing the value of resistor 23, or by connecting galvanometer 25 to an intermediate tap on resistor 23, instead of to the junction with milliammeter 24. Conversely, sensitivity is reduced by increasing the value of resistor 23. With suitable switching means to vary this resistance, a multi-range instrument is obtained.

Refer now to Fig. 3, which shows a modification using only one phototube. Such a modification might be used where it is desired to measure the intensity of a beam of light, rather than its deflection. Here again, two vacuum tube sections 28 and 29 are connected to load resistors 30 and 31 and a common cathode resistor 32. The voltage divider connected to section 28 comprises a resistor 33 and a phototube 34: it differs from the Fig. 2 circuit in that a resistor has replaced one of the phototubes. The voltage divider connected to section 29 comprises two resistors 35 and 36. Voltage-responsive apparatus, such as voltmeter 37, is connected between the two plates.

In this circuit the resistance of phototube 34 is a function of the amount of light which strikes the phototube. Changes in the amount of light striking the phototube change its resistance relative to that of resistor 33, instead of relative to another phototube as in the two previous circuits. Otherwise, operation of the circuit shown in Fig. 3 is the same as that of the circuits shown in Figs. 1 and 2. Note that the voltage across phototube 34 remains substantially constant regardless of changes in its impedance. This characteristic makes the circuit valuable for testing non-linear impedance, which can be inserted in place of phototube 34.

Numerous other modifications and combinations of modifications are possible. For example, both voltage dividers may contain phototubes. As one illustration, in the circuit of Fig. 3 resistor 36 may be replaced by a phototube. The circuit will then respond to inequality in the amount of illumination of the two phototubes. If the supply voltage is well regulated, modifications employing non-symmetrical circuits may be used. Or, other and perhaps more elaborate amplifiers may replace the vacuum tube sections.

Having described the principle of this invention and the best mode in which I have contemplated applying that principle, I wish it to be understood that the apparatus described is illustrative only, and that other means can be employed without departing from the true scope of the invention defined by the following claims.

What I claim as new and desire to secure by Letters Patent of the United States is:

1. In a measuring circuit, the combination of two vacuum tube sections each having a cathode, control grid, and plate, a plate-to-cathode circuit for each section, a first voltage divider having its respective ends connected to two points in the plate-to-cathode circuit of one section between which voltage varies responsive to changes in current through such section and having an intermediate point connected to the control grid of the same section, and a second voltage divider connected in like manner to the other section, at least one of said voltage dividers including an element having an impedance which varies responsive to changes in a quantity to be measured.

2. In combination, two vacuum tube sections each having a cathode, control grid, and plate, a plate-to-cathode circuit for each section, two voltage dividers respectively connected to the two sections, each divider having its respective ends connected to two points in the plate-to-cathode circuit of its section between which voltage varies responsive to changes in current through such section and having an intermediate point connected to the control grid of its section, at least one of said voltage dividers including at least one phototube.

3. A circuit comprising two vacuum tube sections each having a cathode, control grid, and plate, two load resistors respectively connected to the two plates, a cathode resistor common to both sections, means to apply operating voltages to the vacuum tube sections, and two voltage dividers respectively connected to the two sections, each divider having one end connected to the plate of its section, an intermediate point connected to the control grid of its section, and the other end connected to the cathode resistor, at least one of said voltage dividers including at least one phototube.

4. A circuit comprising two vacuum tube sections each having a cathode, control grid, and plate, two load resistors respectively connected to the two plates, a cathode resistor common to both sections, means to apply operating voltages to the vacuum tube sections, three resistors connected in series between the plate of one vacuum tube section and the cathode resistor, two phototubes connected in series across the center one of said three series-connected resistors, the control grid of the same vacuum tube section being connected to the junction of the two phototubes, two resistors connected in series between the plate of the other vacuum tube section and the cathode resistor, the control grid of such other vacuum tube section being connected to the junction of said two series-connected resistors, and voltage-responsive apparatus connected between the plates of the two vacuum tube sections.

5. A circuit comprising two vacuum tube sections each having a cathode, control grid, and plate, two load resistors respectively connected to the two plates, a cathode resistor common to both sections, means to apply operating voltages to the vacuum tube sections, two phototubes connected in series between the plate of one vacuum tube section and the cathode resistor, the control grid of the same vacuum tube section being connected to the junction of the two phototubes, two resistors connected in series between the plate of the other vacuum tube section and the cathode resistor, the control grid of such other vacuum tube section being connected to the junction of said two series-connected resistors, and voltage-responsive apparatus connected between the plates of the two vacuum tube sections.

6. A circuit comprising two vacuum tube sections each having a cathode, control grid, and plate, two load resistors respectively connected to the two plates, a cathode resistor common to both sections, means to apply operating voltages to the vacuum tube sections, a resistor and a phototube connected in series between the plate of one vacuum tube section and the cathode resistor, the control grid of the same vacuum tube section being connected to the junction of the series-connected resistor and phototube, two resistors connected in series between the plate of the other vacuum tube section and the cathode resistor, the control grid of such other vacuum tube section being connected to the junction of said two series-connected resistors, and voltage-responsive apparatus connected between the plates of the two vacuum tube sections.

THEODORE A. RICH.

REFERENCES CITED

The following references are of record in the file of this patent:

UNITED STATES PATENTS

| Number | Name | Date |
|---|---|---|
| 2,237,950 | Pineo | Apr. 8, 1941 |
| 2,428,806 | Liben et al. | Oct. 14, 1947 |